US00RE36345E

United States Patent [19]

Moore

[11] E Patent Number: Re. 36,345

[45] Reissued Date of Patent: Oct. 19, 1999

[54] AUTOMOTIVE STORAGE NET

[75] Inventor: Donal Moore, Birmingham, Mich.

[73] Assignee: Tecsyn, Inc., Canada

[21] Appl. No.: 08/971,907

[22] Filed: Nov. 17, 1997

Related U.S. Patent Documents

Reissue of:

[64] Patent No.: 5,340,004
Issued: Aug. 23, 1994
Appl. No.: 07/874,636
Filed: Apr. 27, 1992

[51] Int. Cl.[6] ..... B60R 9/00

[52] U.S. Cl. ..... 224/563; 224/42.34; 296/37.1

[58] Field of Search ..... 224/563, 545, 224/42.34, 549; 383/17, 24, 43; 296/37.1, 37.5, 37.6, 37.13, 37.16, 24.1; 280/727, 741; 211/801

[56] References Cited

U.S. PATENT DOCUMENTS

| | | | |
|---|---|---|---|
| 1,837,537 | 12/1931 | Emerson | 224/42.32 |
| 2,705,461 | 4/1955 | Campbell | 410/97 |
| 2,986,315 | 5/1961 | Zimmerman | 224/42.32 |
| 3,438,673 | 4/1969 | Nelson | 296/37 |
| 3,986,656 | 10/1976 | November | 229/15 |
| 4,189,056 | 2/1980 | Majewski | 211/195 |
| 4,964,771 | 10/1990 | Callihan | 410/118 |
| 5,012,963 | 5/1991 | Rosenbaum | 224/42.46 R |
| 5,040,711 | 8/1991 | Niederhauser et al. | 224/42.46 R |
| 5,058,786 | 10/1991 | Politi | 224/42.32 |
| 5,118,019 | 6/1992 | Harrison | 224/42.46 R |
| 5,121,958 | 6/1992 | Goeden et al. | 296/37.1 |

FOREIGN PATENT DOCUMENTS

| | | |
|---|---|---|
| 263056 | 6/1985 | Germany . |
| 272142 | 12/1983 | Japan . |
| 60-101458 | 11/1988 | Japan . |
| 2196907 | 5/1988 | United Kingdom . |

OTHER PUBLICATIONS

Translation of Japanese publication 2–72142, which was cited in Information Disclosure Statement filed Nov. 17, 1997.

One Sheet of figures (untitled) no date.

Ford Parts and Service Division Training and Publications Dep. 1985 Owner Guide for Merkur XR4T.

*Primary Examiner*—David J. Walczak
*Attorney, Agent, or Firm*—Young & Basile, P.C.

[57] ABSTRACT

A storage net useful in the storage area of a motor vehicle is disclosed. The storage net comprises a storage area having a front, a back and two sides, the front and back being pivotally connected at one end. A mechanism is included for providing a predetermined amount of longitudinal elasticity to the storage area. Further, the storage net comprises a mechanism for removably attaching the storage area to a desired surface or to the stowage area.

43 Claims, 3 Drawing Sheets

AUTOMOTIVE STORAGE NET

Matter enclosed in heavy brackets [ ] appears in the original patent but forms no part of this reissue specification; matter printed in italics indicates the additions made by reissue.

BACKGROUND OF THE INVENTION

The present invention relates generally to storage nets, and more specifically to a storage net mountable in a motor vehicle stowage compartment.

For years, consumers have sought more efficient, convenient and versatile ways to transport contents to be stowed in a motor vehicle such as a van, automobile trunk or four wheel drive off-the-road vehicle. Conventional means of stowage transport have consisted mainly in trunk space, beds of pick-up trucks, or the area behind the rear seats in a van. These means have served their purpose satisfactorily, however, several drawbacks exist.

One disadvantage of the examples cited above is that stowage is freely movable within the stowage compartment, and can be damaged in the event of a sudden stop. Further, conventional stowage transporting means generally have only one large compartment, and it is difficult to transport a mixture of heavy items with more delicate or fragile items.

Thus, it is an object of the present invention to provide an automotive storage net which will advantageously provide safety to contents to be stowed in the vehicle. It is a further object of the present invention to provide such a net which is expandable to receive a sufficient amount of stowage, yet non-elastic enough to prevent stowed items within the net from moving more than a predetermined distance. It is a further object of the present invention to provide a net which will prevent stowage from inadvertently leaving the net during operation of the motor vehicle. It is a further object of the present invention to provide a net which can divide a single stowage transporting area into one or more discrete and sectioned areas within the stowage area. Still further, it is an object of the present invention to provide such a net which is strong and resilient, yet lightweight, thereby preserving fuel efficiency.

SUMMARY OF THE INVENTION

The present invention addresses and solves the above-mentioned problems by providing a storage net useful in the stowage area of a motor vehicle. The storage net comprises a storage area having a front, a back and two sides, the front and back being pivotally connected at one end. Means are included for providing a predetermined amount of longitudinal elasticity to the storage area. Further, the storage net comprises means for removably attaching the storage area to a desired surface or to the stowage area.

BRIEF DESCRIPTION OF THE DRAWINGS

Other objects, features and advantages of the present invention will become apparent by reference to the following detailed description and to the drawings, in which.

DETAILED DESCRIPTION OF THE PREFERRED EMBODIMENTS

Figure 1:
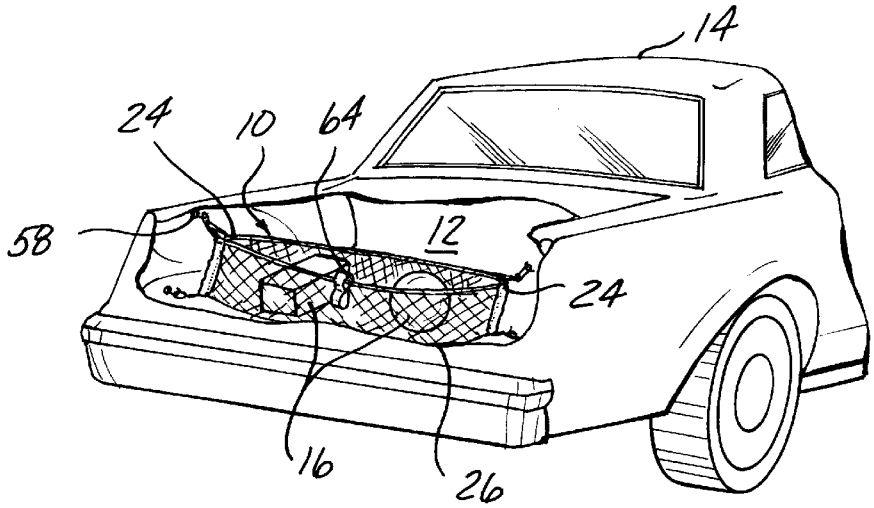
FIG. 1 is a cutaway perspective view showing the storage net in place in the trunk of an automobile.

Referring now to FIG. 1, the storage or convience net of the present invention is designated generally as 10. In FIG. 1, storage net 10 is shown removably mounted in the trunk compartment 12 of an automobile 14. Net 10 is shown carrying various stowage 16.

Figure 2:
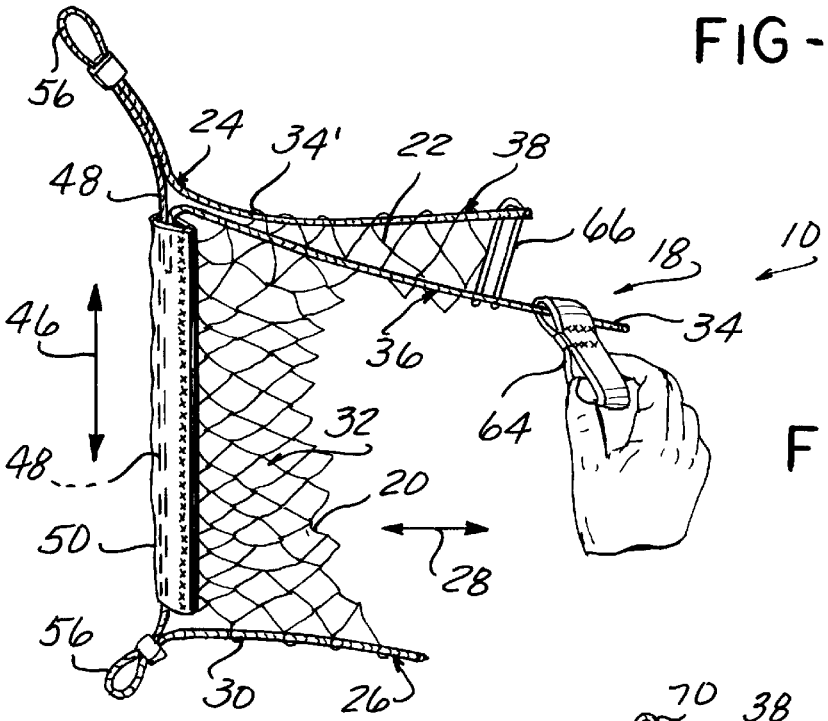
FIG. 2 is an enlarged, cutaway perspective view of one embodiment of the storage net, showing the optional spacer in place, as well as a user's hand in conjunction with the optional handle.

Referring now to FIG. 2, net 10 comprises a storage area 18 having a front 20, a back 22 and two sides 24. Front 20 and back 22 are pivotally connected at one end 26.

The storage net 10 further comprises means for providing a predetermined amount of longitudinal elasticity to storage area 18. The longitudinal elasticity enables storage area 18 to move in the direction of double arrow 28. It is to be understood that the longitudinal elasticity means may comprise any suitable means, and the amount of elasticity will be determined according to the particular requirement necessitated by the desired end use. In a preferred embodiment, the longitudinal elasticity providing means comprises an elastic member 30 attached to the one end 26. This elastic member 30 may comprise any suitable means, but in the preferred embodiment, it comprises an elastic cord threaded through the mesh 32 of storage area 18.

The longitudinal elasticity providing means may further or alternately comprise two elastic members 34, 34', one member 34 being attached to the front edge 36 distal from the one end 26, and the other member being attached to the back edge 38 distal from the one end 26. In the embodiments shown in FIGS. 4 and 5, net 10' and 10" has elastic members 34, 34' extending the full length of front edge 36 and back edge 38. In each of the three embodiments shown in FIGS. 2, 4 and 5, the elastic members 34, 34' comprise elastic cord. This elastic cord may be formed of any suitable material, however, in the preferred embodiment, this cord is formed of a Bungee-type cord.

Figure 7:
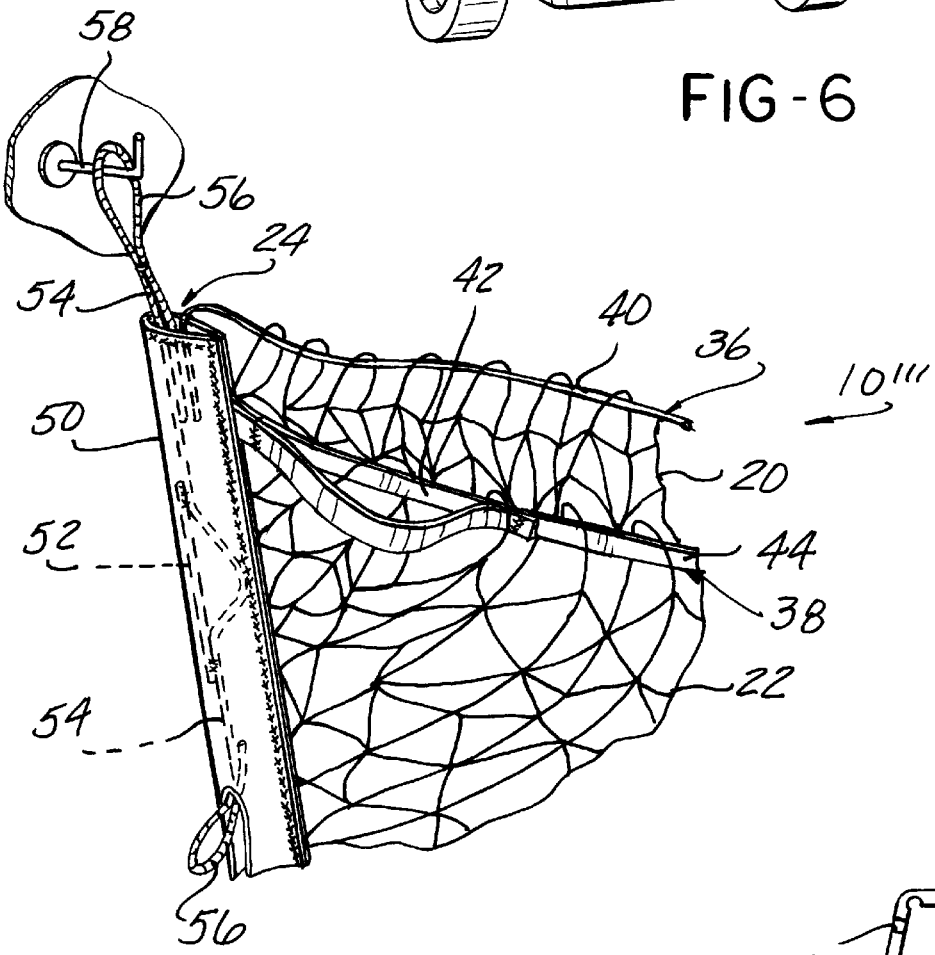
FIG. 7 is an enlarged, cutaway perspective view of the embodiment of the storage net shown in FIG. 6[.]; *and*
Figure 8:
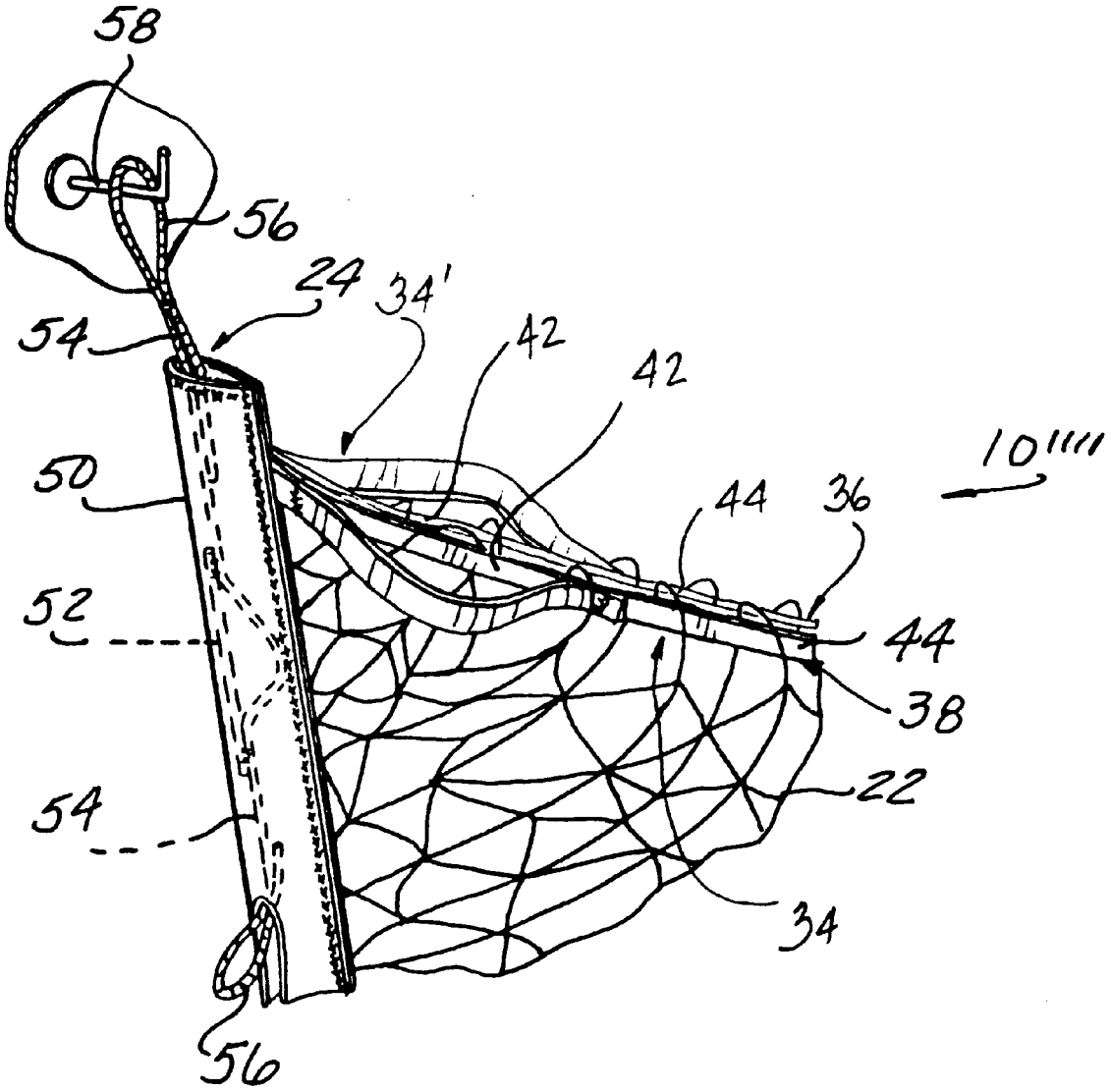
*FIG. 8 is an enlarged, cutaway perspective view of an alternate embodiment of the storage net of the present invention.*

Referring now to [FIG.] *FIGS.* 7 *and 8*, [a] further [embodiment] *embodiments* of the storage net, designated generally as 10'" [is] *and 10"" are* shown, which [is] *are* particularly useful for vans, pick-ups, and four wheel drive, off-road vehicles, as well as for cars. In [this embodiment] *these embodiments*, one or both of the elastic members comprises an elastic bungee-type cord 40 extending the full length of one of the front and back edges 36, 38, respectively. In FIG. 7, elastic cord 40 extends the full length of front edge 36, and is in the position which faces the tailgate. The elastic member attached to back edge 38 comprises an elastic band 42 attached to and spaced from a flexible, substantially inelastic strap 44. The elastic band 42 may be attached to strap 44 by any suitable means, such as stitching or mechanical tacking. The elastic band 42 will allow a certain degree of longitudinal movement, however, the inelastic strap 44 will limit this movement when strap 44 is extended to its full length and elastic band 42 is closely adjacent and parallel to inelastic strap 44. It is to be understood that the band 42/strap 44 arrangement may comprise one or both of the elastic members. *This band 42/strap 44 arrangement comprises one of the elastic members in FIG. 7; and it comprises both of the elastic members 34, 34' in FIG. 8.*

It is to be understood that a single storage net may be formed of any of the longitudinal elasticity providing means disclosed herein and in the above four embodiments in any combination thereof, i.e. both front and back edges 36, 38 may have the elastic members formed of strap 44 and band 42, or both may be formed of elastic cord 40.

Figure 4:
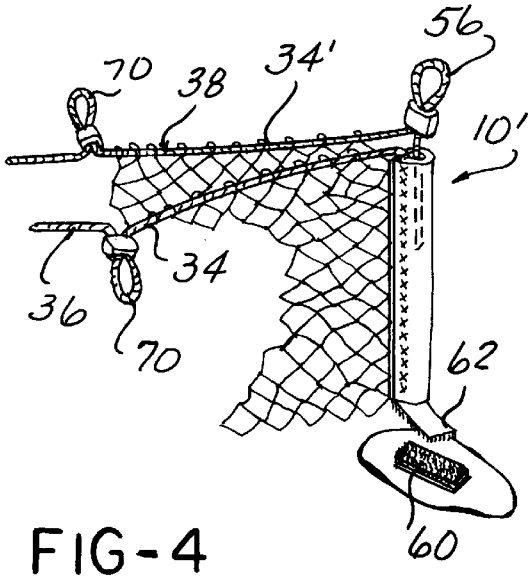
FIG. 4 is an enlarged, cutaway perspective view of an alternate embodiment of the storage net, showing a mating hook and loop attachment at the lower end of the net.
Figure 5:
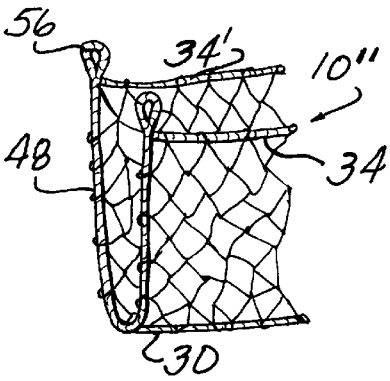
FIG. 5 is an enlarged, cutaway perspective view of another alternate embodiment of the storage net.
Figure 6:
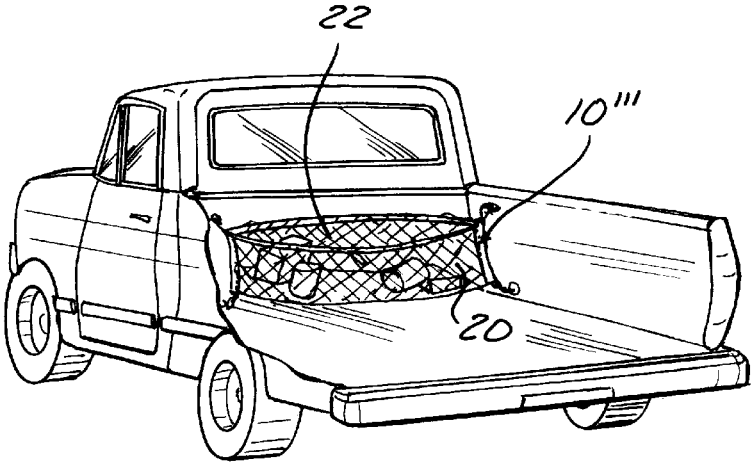
FIG. 6 is a cutaway perspective view showing a further alternate embodiment of the storage net in place in the bed area of a pickup truck; [and]

The sides 24 of storage net 10 may be open, to define a hammock-like storage area as shown in FIG. 5. In this embodiment, elastic members 48 are generally used on both sides 24, either with or without sheath 50, and elastic member 30 is optional. Sides 24 may also be closed, to define an envelopelike storage area 18, as shown in FIGS. 1, 2, 4 and 6.

The storage net 10 may further comprise means for providing a predetermined amount of transverse elasticity to storage area 18. This means would allow elasticity in the direction of double arrow 46. It is to be understood that this means may comprise any suitable means, however, in a preferred embodiment, it comprises an elastic member 48 attached to each of the two sides 24.

As shown in FIGS. 2 and 5, elastic member 48 may comprise an elastic, bungee-type cord, either freely movable within a sheath 50, or threaded within mesh 32 as shown in FIG. 5. As shown in FIG. 7, side 24 may also be limited in its elastic movement, much in the same way as with band 42 and strap 44. A portion of elastic cord 52 is attached to and spaced from a braided, substantially inelastic cord 54. In this way, transverse elasticity is limited by the predetermined length of braided, inelastic cord 54.

Storage net 10 further comprises means for removably attaching storage area 18 to a desired surface. Net 10 may have application in many areas, but is especially suited for use in stowage areas of motor vehicles, as, for example, shown in FIGS. 1 and 6. This stowage area may be located in any area of the motor vehicle, including the passenger compartment. The attaching means may comprise any suitable means. This means may comprise loops 56 attached to one of the desired surface or stowage area and the storage area 18, and hooks 58, or any other suitable fastener, attached to the other of the desired surface and the storage area 18. In the embodiment shown in FIG. 2, loops 56 are comprised of elastic member 48 and are disposed at the top and bottom of each side 24. In FIG. 4, loop 56 is disposed at the top of side 24, and the attaching means used at the bottom of side 24 is a mating hook 60 and loop 62 type arrangement, one such arrangement being commercially available as VELCRO brand fasteners. Further, center loops 70 are optionally provided to prevent sagging of the net 10', and are especially useful when extending along the side of a passenger compartment, truck bed, etc. In FIG. 7, braided cord 54 terminates in loops 56 extending out of the top and bottom of each of sides 24.

Storage net 10 may further comprise a handle 64 attached to the storage area 18, for case in adding and removing contents to and from storage area 18.

Front 20 and back 22 may be formed of two separate pieces, or may be formed from one, integral piece. Front 20 and back 22 may be formed of any suitable material, however, in the preferred embodiment, it is formed of a lightweight, woven mesh netting. This strong yet lightweight material is preferably formed from a nylon material, or any other suitable synthetic or natural material. Sheath 50, strap 44 and handle 64 may all be formed of any suitable material such as a textile material, but in the preferred embodiment, these are preferably made from a reinforced multi-filament polypropylene or polyester.

Figure 3:
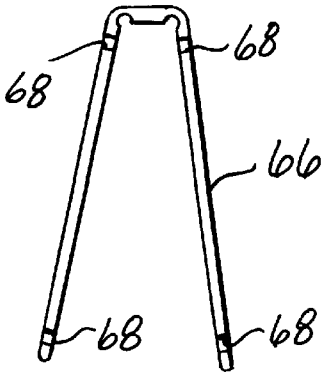
FIG. 3 is an enlarged top view of the spacer shown in FIG. 2.

Storage net 10 may further comprise a spacer member 66 removably attached to, and extending between the front edge 36 and the back edge 38, as seen in FIG. 2. Spacer 66 may be located at any point along edges 36, 38, and preferably is located adjacent one of sides 24. As best seen in FIG. 3, spacer member 66 is in an inverted V-shape, and has slots 68 formed therein for receiving elastic member 34. The upper opening of slot 68 is smaller in width than elastic member 34, such that spacer member slots 68 have to be temporarily deformed in order to push elastic members 34 therein. This serves to securely hold elastic members 34 within slots 68 until the user wishes to remove spacer 66. Spacer 66 may be formed of any suitable material, but in the preferred embodiment, this material is a crystalline himont polypropylene.

The embodiments shown in FIGS. 2, 4 and 5 are particularly useful for light objects which experience a low G-force. The embodiment shown in FIG. 7 is particularly useful for heavier objects which will experience a substantial G-force. The net of the present invention restrains items stowed in the net from moving more than a predetermined distance in any direction. Another advantage of the net is that, after stowing items within the net, front and back edges 36, 38 will come together tightly enough to prevent stowage from falling out of the top of the net.

While preferred embodiments of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. A storage net, comprising:

a storage area having a front, a back and two *closed* sides, the front and back being pivotally connected at one end and each having edges distal from the one end, and each of the front and back edges having a length extending between the two sides;

means for providing a predetermined amount of longitudinal elasticity to the storage area, comprising two elastic members, one member being attached to the front edge and the other member being attached to the back edge, wherein one of the elastic members extends the length of one of the front and back edges, wherein the elastic member extending the length comprises elastic cord, and wherein the other elastic member comprises an elastic band attached to and spaced from a flexible, substantially inelastic strap[, and wherein];

*means for drawing* the front and back edges [draw] together firmly enough as to prevent the stowed items from inadvertently escaping therebetween; and means for removably attaching the storage area to a desired surface;

wherein items stowed in the storage area are prevented from moving more than a predetermined distance in any direction.

2. A storage net, comprising:

a storage area having a front, a back and two *closed* sides, the front and back being pivotally connected at one end and each having edges distal from the one end, and each of the front and back edges having a length extending between the two sides;

means for providing a predetermined amount of longitudinal elasticity to the storage area, comprising two elastic members, one member being attached to the front edge and the other member being attached to the back edge, wherein the elastic members extend the length of the front and back edges, wherein the elastic members comprise an elastic band attached to and spaced from a flexible, substantially inelastic strap[, and wherein]*;*

*means for drawing* the front and back edges [draw] together firmly enough as to prevent the stowed items from inadvertently escaping therebetween; and means for removably attaching the storage area to a desired surface;

wherein items stowed in the storage area are prevented from moving more than a predetermined distance in any direction.

[3. A storage net, comprising:

a storage area having a front, a back and two sides, the front and back extending in a longitudinal direction and being pivotally connected at one end, each of the two sides extending in a transverse direction and being open;

means for providing a predetermined amount of longitudinal elasticity to the storage area;

means for providing a predetermined amount of transverse elasticity to the storage area; and means for removably attaching the storage area to a desired surface;

wherein items stowed in the storage area are prevented from moving more than a predetermined distance in any direction.]

4. A storage net, comprising:

a storage area having a front, a back and two *closed* sides, the front and back extending in a longitudinal direction and being pivotally connected at one end, each of the two sides extending in a transverse direction:

means for providing a predetermined amount of longitudinal elasticity to the storage area;

means for providing a predetermined amount of transverse elasticity to the storage area, wherein the transverse elasticity providing means comprises an elastic member attached to each of the two sides, and wherein the elastic member comprises one of elastic cord and a portion of elastic cord attached to and spaced from a braided, substantially inelastic cord; and means for removably attaching the storage area to a desired surface;

wherein items stowed in the storage area are prevented from moving more than a predetermined distance in any direction.

5. The storage net as defined in claim 4 wherein the longitudinal elasticity providing means comprises an elastic member attached to the one end.

6. The storage net as defined in claim 4 wherein the front and back each have edges distal from the one end and wherein the longitudinal elasticity providing means comprises two elastic members, one member being attached to the front edge and the other member being attached to the back edge, wherein the *storage net further comprises means for drawing the* front and back edges [draw] together firmly enough as to prevent the stowed items from inadvertently escaping therebetween.

7. The storage net as defined in claim 6 wherein each of the front and back edges has a length extending between the two sides, and wherein one of the elastic members extends the length of one of the front and back edges.

8. The storage net as defined in claim 6 wherein each of the front and back edges has a length extending between the two sides, and wherein the elastic members extend the length of the front and back edges.

9. The storage net as defined in claim 8 wherein the elastic members comprise elastic cord.

10. The storage net as defined in claim [5] *6*, further comprising a spacer member removably attached to, and extending between the front and back edges.

[11. The storage net as defined in claim 4 wherein each of the two sides is closed.]

12. The storage net as defined in claim 4 wherein the front and back are formed of a lightweight, woven mesh netting.

13. The storage net as defined in claim 4, further comprising a handle attached to the storage area.

14. A storage net, comprising:

a storage area having a front, a back and two *closed* sides, the front and back extending in a longitudinal direction and being pivotally connected at one end;

means for providing a predetermined amount of longitudinal elasticity to the storage area; and means for removably attaching the storage area to a desired surface, wherein the attaching means comprises loops attached to the storage area, and hooks adapted to be attached to the desired surface;

wherein items stowed in the storage area are prevented from moving more than a predetermined distance in any direction.

15. The storage net as defined in claim 14 wherein the longitudinal elasticity providing means comprises an elastic member attached to the one end.

16. The storage net as defined in claim 14 wherein the front and back each have edges distal from the one end and wherein the longitudinal elasticity providing means comprises two elastic members, one member being attached to the front edge and the other member being attached to the back edge, wherein the *storage net further comprises means for drawing the* front and back edges [draw] together firmly enough as to prevent the stowed items from inadvertently escaping therebetween.

17. The storage net as defined in claim 16 wherein each of the front and back edges has a length extending between the two sides, and wherein one of the elastic members extends the length of one of the front and back edges.

18. The storage net as defined in claim 16 wherein each of the front and back edges has a length extending between the two sides, and wherein the elastic members extend the length of the front and back edges.

19. The storage net as defined in claim 18 wherein the elastic members comprise elastic cord.

20. The storage net as defined in claim [18] *16*, further comprising a spacer member removably attached to, and extending between the front and back edges.

[21. The storage net as defined in claim 14 wherein each of the two sides is open.]

[22. The storage net as defined in claim 14 wherein each of the two sides is closed.]

23. The storage net as defined in claim 14 wherein the front and back are formed of a lightweight, woven mesh netting.

24. The storage net as defined in claim 14, further comprising a handle attached to the storage area.

25. A storage net, comprising:

a woven mesh, nylon netting storage area having a front, a back and two sides, the sides being closed to define an envelope-like storage area, the front and back being pivotally connected at one end and each having edges distal from the one end;

means for providing a predetermined amount of longitudinal elasticity to the storage area, the longitudinal elasticity providing means comprising two elastic members, one member [being] attached to*, and extending the length of* the front edge and the other member [being] attached to*, and extending the length of* the back edge*, wherein one of the elastic members comprises elastic cord, and wherein the other elastic member is substantially inelastic*;

means for providing a predetermined amount of transverse elasticity to the storage area, the transverse elasticity providing means comprising an elastic member attached to each of the two sides; [and]

*means for drawing the front and back edges together firmly enough as to prevent the stowed items from inadvertently escaping therebetween; and* means for attaching the storage area to a desired surface;

wherein items stowed in the storage area are prevented from moving more than a predetermined distance in any direction [and wherein the front and back edges draw together firmly enough as to prevent the stowed items from inadvertently escaping therebetween].

26. A motor vehicle having a stowage area and a storage net disposed in the stowage area, the storage net comprising:

a storage area having a front, a back and two *closed* sides, the front and back extending in a longitudinal direction and being pivotally connected at one end and each having edges distal from the one end, each of the front and back edges having a length extending between the two sides;

means for providing a predetermined amount of longitudinal elasticity to the storage area, comprising two elastic members, one member being attached to the front edge and the other member being attached to the back edge, wherein one of the elastic members extends the length of one of the front and back edges, wherein the elastic member extending the length comprises elastic cord, and wherein the other elastic member comprises an elastic band attached to and spaced from a flexible, substantially inelastic strap[wherein]*;*

*means for drawing* the front and back edges [draw] together firmly enough as to prevent the stowed items from inadvertently escaping therebetween; and means for removably attaching the storage area to the stowage area;

wherein items stowed in the storage area are prevented from moving more than a predetermined distance in any direction.

27. A motor vehicle having a stowage area and a storage net disposed in the stowage area, the storage net comprising:

a storage area having a front, a back and two *closed* sides, the front and back being pivotally connected at one end and each having edges distal from the one end, and each of the front and back edges having a length extending between the two sides;

means for providing a predetermined amount of longitudinal elasticity to the storage area, comprising two elastic members, one member being attached to the front edge and the other member being attached to the back edge, wherein the elastic members extend the length of the front and back edges, wherein the elastic members comprise an elastic band attached to and spaced from a flexible, substantially inelastic strap[, and]*;*

[wherein] *means for drawing* the front and back edges [draw] together firmly enough as to prevent the stowed items from inadvertently escaping therebetween; and means for removably attaching the storage area to the stowage area;

wherein items stowed in the storage area are prevented from moving more than a predetermined distance in any direction.

[28. A motor vehicle having a stowage area and a storage net disposed in the stowage area, the storage net comprising:

a storage area having a front, a back and two sides, the front and back extending in a longitudinal direction and being pivotally connected at one end, each of the two sides extending in a transverse direction and being open;

means for providing a predetermined amount of longitudinal elasticity to the storage area;

means for providing a predetermined amount of transverse elasticity to the storage area; and means for removably attaching the storage area to the stowage area;

wherein items stowed in the storage area are prevented from moving more than a predetermined distance in any direction.]

29. A motor vehicle having a stowage area and a storage net disposed in the stowage area, the storage net comprising:

a storage area having a front, a back and two *closed* sides, the front and back extending in a longitudinal direction and being pivotally connected at one end, each of the two sides extending in a transverse direction;

means for providing a predetermined amount of longitudinal elasticity to the storage area;

means for providing a predetermined amount of transverse elasticity to the storage area, wherein the transverse elasticity providing means comprises an elastic member attached to each of the two sides, and wherein the elastic member comprises one of elastic cord and a portion of elastic cord attached to and spaced from a braided, substantially inelastic cord; and means for removably attaching the storage area to the stowage area;

wherein items stowed in the storage area are prevented from moving more than a predetermined distance in any direction.

30. The motor vehicle as defined in claim 29 wherein the front and back are formed of a woven mesh, nylon netting.

31. The motor vehicle as defined in claim 29, the storage net further comprising a handle attached to the storage area.

32. The motor vehicle as defined in claim 29 wherein the longitudinal elasticity providing means comprises an elastic member attached to the one end.

33. The motor vehicle as defined in claim 29 wherein the front and hack each have edges distal from the one end and wherein the longitudinal elasticity providing means comprises two elastic members, one member being attached to the front edge and the other member being attached to the back edge, wherein the *storage net further comprises means for drawing the* front and back edges [draw] together firmly enough as to prevent the stowed items from inadvertently escaping therebetween.

34. The motor vehicle as defined in claim 33 wherein each of the front and back edges has a length extending between the two sides, and wherein one of the elastic members extends the length of one of the front and back edges.

35. The motor vehicle as defined in claim 33 wherein each of the front and back edges has a length extending between the two sides, and wherein the elastic members extend the length of the front and back edges.

36. The motor vehicle as defined in claim 35 wherein the elastic members comprise elastic cord.

[37. The motor vehicle as defined in claim 29 wherein each of the two sides is closed.]

38. A motor vehicle having a stowage area and a storage net disposed in the stowage area, the storage net comprising:

a storage area having a front, a back and two *closed* sides, the front and back extending in a longitudinal direction and being pivotally connected at one end;

means for providing a predetermined amount of longitudinal elasticity to the storage area; and means for removably attaching the storage area to the stowage area, wherein the attaching means comprises loops attached to the storage area, and hooks adapted to be attached to the stowage area;

wherein items stowed in the storage area are prevented from moving more than a predetermined distance in any direction.

39. The motor vehicle as defined in claim 38 wherein the longitudinal elasticity providing means comprises an elastic member attached to the one end.

40. The motor vehicle as defined in claim 38 wherein the front and back each have edges distal from the one end and wherein the longitudinal elasticity providing means comprises two elastic members, one member being attached to the front edge and the other member being attached to the back edge, wherein the *storage net further comprises means for drawing the* front and back edges [draw] together firmly enough as to prevent the stowed items from inadvertently escaping therebetween.

41. The motor vehicle as defined in claim 40 wherein each of the front and back edges has a length extending between the two sides, and wherein one of the elastic members extends the length of one of the front and back edges.

42. The motor vehicle as defined in claim 40 wherein each of the front and back edges has a length extending between the two sides, and wherein the elastic members extend the length of the front and back edges.

43. The motor vehicle as defined in claim 42 wherein the elastic members comprise elastic cord.

44. The motor vehicle as defined in claim [450] *40*, further comprising a spacer member removably attached to, and extending between the front and back edges.

[45. The motor vehicle as defined in claim 38 wherein each of the two sides is open.]

[46. The motor vehicle as defined in claim 38 wherein each of the two sides is closed.]

47. The motor vehicle as defined in claim 38 wherein the front and back are formed of a woven mesh, nylon netting.

48. The motor vehicle as defined in claim 38, the storage net further comprising a handle attached to the storage area.

49. A motor vehicle having a stowage area and a storage net disposed in the stowage area, the storage net comprising:

a woven mesh, nylon netting storage area having a front, a back and two sides, the sides being closed to define an envelope-like storage area, the front and back being pivotally connected at one end and each having edges distal from the one end;

means for providing a predetermined amount of longitudinal elasticity to the storage area, the longitudinal elasticity providing means comprising two elastic members, one member being attached to the front edge and the other member being attached to the back edge;

means for providing a predetermined amount of transverse elasticity to the storage area, the transverse elasticity providing means comprising an elastic member attached to each of the two sides; [and]

*means for drawing the front and back edges together firmly enough as to prevent the stowed items from inadvertently escaping therebetween; and* means for attaching the storage area to the stowage area;

wherein items stowed in the storage area are prevented from moving more than a predetermined distance in any direction [and wherein the front and back edges draw together firmly enough as to prevent the stowed items from inadvertently escaping therebetween].

50. A storage net, comprising:

a storage area having a front, a back and two *closed* sides, the front and back extending in a longitudinal direction and being pivotally connected at one end;

means for providing a predetermined amount of longitudinal elasticity to the storage area; and means for removably attaching the storage area to a desired surface, wherein the attaching means comprises loops adapted to be attached to the desired surface, and hooks attached to the storage area;

wherein items stowed in the storage area are prevented from moving more than a predetermined distance in any direction.

51. A motor vehicle having a stowage area and a storage net disposed in the stowage area, the storage net comprising:

a storage area having a front, a back and two *closed* sides, the front and back extending in a longitudinal direction and being pivotally connected at one end;

means for providing a predetermined amount of longitudinal elasticity to the storage area; and means for removably attaching the storage area to the stowage area, wherein the attaching means comprises loops adapted to be attached to the stowage area, and hooks attached to the storage area;

wherein items stowed in the storage area are prevented from moving more than a predetermined distance in any direction.

* * * * *